United States Patent
Kaneko

(10) Patent No.: US 9,124,192 B2
(45) Date of Patent: Sep. 1, 2015

(54) FUEL CELL SYSTEM HAVING A CONVERTER WHICH INCREASES AN OUTPUT VOLTAGE OF A FUEL CELL

(75) Inventor: Tomohiko Kaneko, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 202 days.

(21) Appl. No.: 13/824,743

(22) PCT Filed: Dec. 28, 2011

(86) PCT No.: PCT/JP2011/080428
§ 371 (c)(1),
(2), (4) Date: Mar. 18, 2013

(87) PCT Pub. No.: WO2013/098999
PCT Pub. Date: Jul. 4, 2013

(65) Prior Publication Data
US 2013/0176759 A1 Jul. 11, 2013

(51) Int. Cl.
| | |
|---|---|
| *G05F 1/00* | (2006.01) |
| *H02M 7/537* | (2006.01) |
| *H02M 7/515* | (2007.01) |
| *B60L 11/18* | (2006.01) |
| *H01M 8/04* | (2006.01) |
| *H01M 16/00* | (2006.01) |
| *G05F 5/00* | (2006.01) |

(52) U.S. Cl.
CPC ........... *H02M 7/537* (2013.01); *B60L 11/1881* (2013.01); *H01M 8/04313* (2013.01); *H01M 8/04626* (2013.01); *H01M 8/04656* (2013.01); *H01M 8/04947* (2013.01); *H01M 8/04985* (2013.01); *H01M 8/04992* (2013.01); *H01M 16/006* (2013.01); *H02M 7/515* (2013.01); *Y02E 60/50* (2013.01); *Y02T 90/34* (2013.01)

(58) Field of Classification Search
USPC ......... 323/234, 237, 282, 284, 285, 299, 300; 363/74, 78, 95, 97, 98, 124, 131, 132
See application file for complete search history.

(56) References Cited

U.S. PATENT DOCUMENTS

| | | | |
|---|---|---|---|
| 5,436,545 A | 7/1995 | Bahr et al. | |
| 7,279,878 B2 * | 10/2007 | Ootani et al. | 323/285 |
| 2004/0219399 A1 * | 11/2004 | Zhu et al. | 429/13 |
| 2006/0158912 A1 * | 7/2006 | Wu et al. | 363/89 |
| 2008/0084721 A1 | 4/2008 | Miramonti et al. | |

(Continued)

FOREIGN PATENT DOCUMENTS

| | | |
|---|---|---|
| CN | 101252315 A | 8/2008 |
| CN | 101931323 A | 12/2010 |

(Continued)

*Primary Examiner* — Jeffrey Gblende
(74) *Attorney, Agent, or Firm* — Kenyon & Kenyon LLP

(57) ABSTRACT

A fuel cell system includes: a converter disposed between a fuel cell and a load to increase an output voltage of the fuel cell; and a control unit that controls the converter at a predetermined duty ratio, wherein the control unit determines a duty command value for the converter from a feed-forward duty and a feed-back duty which are calculated using a command value of a reactor current that flows through a reactor in the converter and/or using a measurement value of the reactor current. In a low-load operation, the control unit sets, as a measurement value of the reactor current, a value obtained by multiplying a midpoint measurement value measured at an intermediate time of an on-duty period by a predetermined coefficient.

5 Claims, 4 Drawing Sheets

(56) References Cited

U.S. PATENT DOCUMENTS

| | | |
|---|---|---|
| 2008/0196950 A1 | 8/2008 | Stancu et al. |
| 2009/0212634 A1* | 8/2009 | Kojima et al. ............... 307/77 |
| 2010/0198421 A1 | 8/2010 | Fahimi et al. |
| 2011/0316511 A1* | 12/2011 | Wang et al. ............... 323/285 |
| 2012/0236612 A1* | 9/2012 | Uno ............................. 363/126 |

FOREIGN PATENT DOCUMENTS

| | | |
|---|---|---|
| JP | 2011-087439 A | 4/2011 |
| JP | 2011-223729 A | 11/2011 |

* cited by examiner

FUEL CELL SYSTEM HAVING A CONVERTER WHICH INCREASES AN OUTPUT VOLTAGE OF A FUEL CELL

This is a 371 national phase application of PCT/JP2011/080428 filed 28 Dec. 2011, the contents of which are incorporated herein by reference.

TECHNICAL FIELD

The present invention relates to a fuel cell system having a converter that increases an output voltage of a fuel cell.

BACKGROUND ART

A known example of a fuel cell system to be mounted on a fuel cell vehicle includes: a load such as a drive motor; a fuel cell that supplies electric power to the load; and a converter disposed between the fuel cell and the load to increase an output voltage of the fuel cell, wherein the converter is feed-back-controlled based on an input voltage value and an output voltage value of the converter which are measured by two respective voltage sensors provided on an input side and an output side of the converter.

In this type of fuel cell system, since sensor errors of the individual voltage sensors may affect accurate operation of the converter, techniques have been developed, as disclosed in, for example, Patent Document 1, to control the input and output voltage of the converter based on a difference in potential between the input side and the output side of the converter.

PRIOR ART REFERENCE

Patent Document

Patent Document 1: JP2011-087439 A

SUMMARY OF THE INVENTION

Problem to be Solved by the Invention

In a fuel cell system having a converter, it is known that electric current flowing through a reactor in the converter (hereinafter called "reactor current") repeatedly increases and decreases together with the periodic on/off action of a switching device in the converter, for example, as shown in FIGS. 3 and 4. When noting the fact that the midpoint value of the increasing and decreasing reactor current corresponds to the average value of the reactor current, responsiveness of controlling the converter can be improved by sampling such midpoint value alone and using it to control the converter.

However, in a low-load operation (which corresponds to, for example, idle running and driving in a traffic jam in the case where the fuel cell system is mounted on a fuel cell vehicle), electric power is not accumulated in the reactor of the converter and, for example, as shown in FIG. 3, the reactor current may exhibit behavior, a so-called discontinuous mode, in which a state wherein there is no current flowing through the reactor arises intermittently.

In such discontinuous mode, there is a gap between the reactor current midpoint value and the actual average current value. When the reactor current exhibits behavior known as a continuous mode, as shown in FIG. 4, no such gap exists and thus no problem occurs; however, there is still room for improvement in always using the reactor current midpoint value to directly control the converter without considering the output state of the fuel cell.

Changing the timing of sampling the reactor current depending on the output state of the fuel cell may be one solution; however, problems including making the control redundant or complex still remain.

The invention has been made in view of the above-described circumstances and has an object of providing a fuel cell system capable of improving responsiveness and accuracy of controlling a converter.

Means for Solving the Problem

In order to solve the above problem, the fuel cell system according to the invention comprises: a converter disposed between a fuel cell and a load to increase an output voltage of the fuel cell; and a control unit that controls the converter at a predetermined duty ratio, wherein the control unit determines a duty command value for the converter from a feed-forward duty and a feed-back duty which are calculated using a command value of a reactor current flowing through a reactor in the converter and/or using a measurement value of the reactor current, and wherein, in a low-load operation in which a required output from the fuel cell is equal to or lower than a predetermined value, the control unit sets, as a measurement value of the reactor current that increases and decreases along with switching control of a switching device in the converter at the predetermined duty ratio, a value obtained by multiplying a midpoint measurement value measured at an intermediate time of an on-duty period by a predetermined coefficient.

With this configuration, while maintaining the midpoint measurement value as a measurement value of the reactor current, the midpoint measurement value is multiplied by a predetermined coefficient and the resulting value is used as a measurement value of the reactor current, and as a result, a gap between the reactor current measurement value to be used for feed-back control and the average of the actual current can be reduced.

In the above configuration, the predetermined coefficient may be defined as $$D_{FF} * V_H / (V_H - V_L)$$

wherein $V_L$ and $V_H$ respectively represent an input voltage and output voltage of the converter and $D_{FF}$ represents the feed-forward duty.

With this configuration, not only in a low-load operation but also in other operations, measurement values obtained by a common equation can be used as the reactor current measurement values to be used for the feed-back control, and as a result, the sharing of common control logic can be achieved.

In other words, the control unit can use, even in an operation other than the low-load operation, a value obtained by multiplying the midpoint measurement value by $D_{FF} * V_H / (V_H - V_L)$ as a measurement value of the reactor current.

Further, instead of the $D_{FF}$, a final command value obtained by reflecting feed-back into the $D_{FF}$ (in other words, the duty command value which is a sum of the feed-forward duty and the feed-back duty) may be used.

In other words, the predetermined coefficient may be defined as $$D * V_H / (V_H - V_L)$$

wherein $V_L$ and $V_H$ respectively represent an input voltage and an output voltage of the converter and D represents the duty command value.

In the above case, the control unit can use, as a measurement value of the reactor current, a value obtained by multiplying the midpoint measurement value by $D * V_H / (V_H - V_L)$, even in an operation other than the low-load operation.

Effect of the Invention

According to the invention, the responsiveness and accuracy of controlling a converter can be improved.

MODE FOR CARRYING OUT THE INVENTION

An embodiment of the invention will be described below, with reference to the respective drawings.

Figure 1:
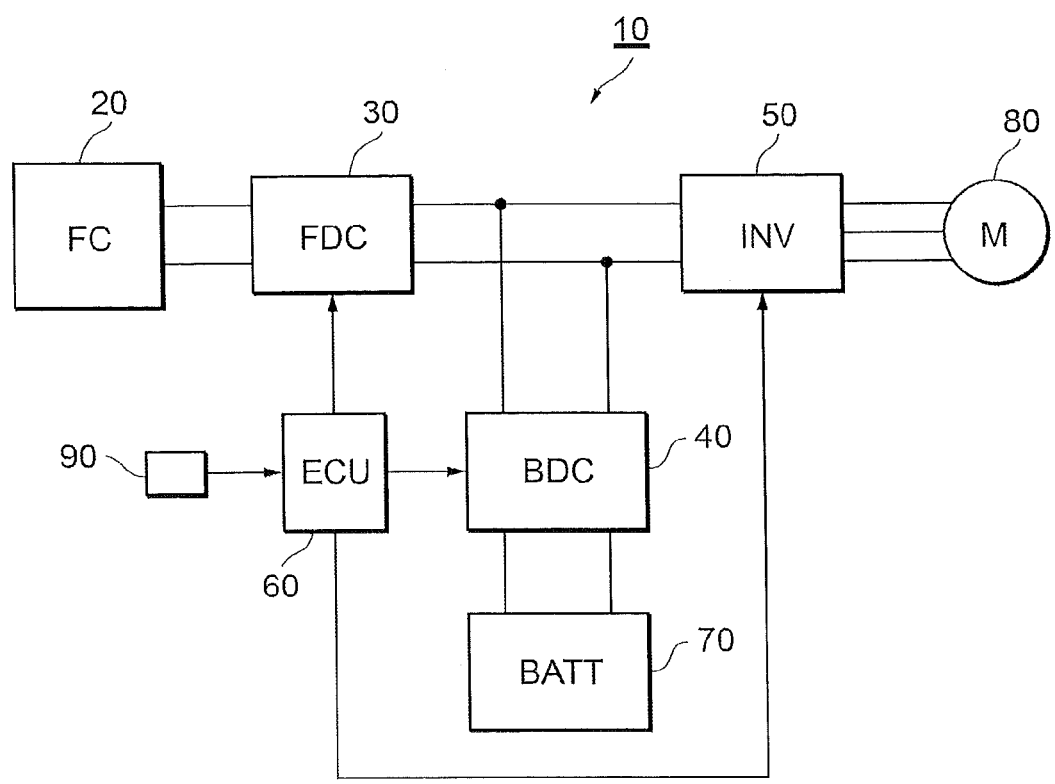
FIG. 1 is a functional block diagram of an electric system for a fuel cell vehicle according to an embodiment of the invention.

FIG. 1 illustrates the functional blocks in an electric system of a fuel cell vehicle in which a fuel cell system according to the embodiment is installed. A fuel cell vehicle having a fuel cell system 10 installed therein uses, as a major power source, a fuel cell 20 that generates electric power through an electrochemical reaction between an oxidant gas and a fuel gas, and also uses a chargeable/dischargeable battery 70 as a subsidiary power source, and supplies electric power to a traction inverter 50 to drive a traction motor (load) 80.

The fuel cell 20 is, for example, a polymer electrolyte type fuel cell, having a stack structure with multiple unit cells stacked therein. Each unit cell has: an air electrode provided on one surface of an electrolyte constituted by an ion-exchange membrane; a fuel electrode provided on the other surface of the electrolyte; and a pair of separators that sandwiches the air electrode and the fuel electrode therebetween.

The battery 70 is a power storage device that functions as: a storage source for surplus electric power; a storage source for regenerative energy during regenerative braking; and an energy buffer during a load variation due to acceleration or deceleration of the fuel cell vehicle, and a suitable example thereof is a secondary battery (nickel-cadmium battery, nickel-hydrogen batter, lithium secondary battery, etc.)

An output voltage of the fuel cell 20 is increased to a predetermined direct-current voltage by a DC/DC converter 30 (hereinafter referred to as a first converter 30) which is a direct-current voltage converter for a fuel cell, and the increased voltage is supplied to the traction inverter 50. Meanwhile, an output voltage of the battery 70 is increased to a predetermined direct-current voltage by a DC/DC converter 40 (hereinafter referred to as a second converter 40) which is a direct-current voltage converter for a battery, and the increased voltage is supplied to the traction inverter 50.

The traction inverter 50 converts the direct-current power supplied from one or both of the fuel cell 20 and the battery 70 into alternating-current power (e.g., a three-phase alternating current), thereby controlling the rotating torque of the traction motor 80. The traction motor 80 is, for example, a three-phase alternating-current motor, and it generates a driving force when the vehicle is driving, while functioning as a motor generator when the vehicle is braking, converting kinetic energy into electric energy and collecting regenerative power.

The second converter 40 decreases the voltage of the surplus power from the fuel cell 20, or of the regenerative power collected by the traction motor 80, and stores the resulting power in the battery 70.

A control unit 60 is a controller having a CPU, ROM, RAM and input/output interface, and it performs, for example, operation control of the fuel cell 20 and switching control of the on-vehicle power converters (first converter 30, second converter 40 and traction inverter 50).

For example, when the control unit 60 receives an ignition signal from an ignition switch, it starts the operation of the fuel cell vehicle and determines required power from the fuel cell system 10 based on signals output from an accelerator sensor regarding the degree of opening of the accelerator as well as signals output from other sensors. In FIG. 1, for convenience, such sensors are collectively indicated by the reference numeral 90. The required power from the fuel cell system 10 is a sum of the power for driving the vehicle and the power for auxiliary devices.

The power for auxiliary devices includes, for example, power consumed by on-vehicle auxiliary devices (humidifier, air compressor, hydrogen pump, cooling water circulation pump, etc.), power consumed by devices necessary for driving the vehicle (transmission, wheel controller, steering device, suspension, etc.) and power consumed by devices arranged in the passenger space (air conditioner, lighting devices, audio system, etc.).

The control unit 60 determines an output power distribution between the fuel cell 20 and the battery 70, controls the amount of fuel gas and oxidant gas supplied to the fuel cell 20 so that the power generated by the fuel cell 20 corresponds to a target power, and also controls the operation point (output voltage, output current) of the fuel cell 20 by controlling the first converter 30 so as to regulate the output voltage of the fuel cell 20.

Further, in order to obtain a target torque according to the degree of opening of the accelerator, for example, the control unit 60 outputs, as switching commands, respective AC voltage command values for a U-phase, V-phase and W-phase to the traction inverter 50, and controls the output torque and rotation speed of the traction motor 80.

Figure 2:
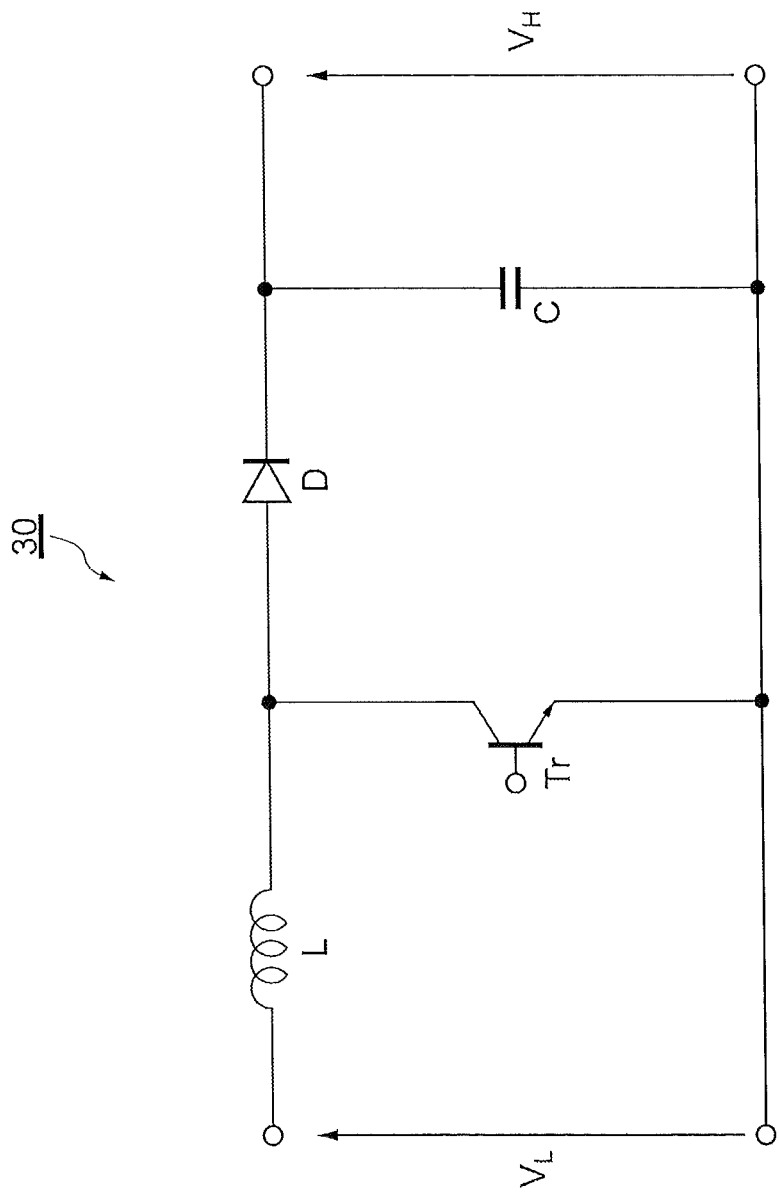
FIG. 2 is a circuit diagram of a boost converter for a fuel cell shown in FIG. 1.

FIG. 2 shows the circuit configuration of the first converter 30. Here, an example in which the first converter 30 is a known DC chopper will be described, as one example. The first converter 30 comprises: a transistor Tr as a switching device that periodically repeats an on/off action according to a carrier frequency; a reactor L; a smoothing capacitor C; and a diode D as a rectifying device.

When the transistor Tr is turned on, energy supplied from the fuel cell 20 is accumulated in the reactor L, and the accumulated energy is transferred to the smoothing capacitor C through the diode D when the transistor is turned off. By repeating the above process, the energy accumulated in the smoothing capacitor C increases and, as a result, an output voltage $V_H$ can be increased so as to be higher than an input voltage $V_L$.

Here, the input voltage $V_L$ corresponds to an output voltage of the fuel cell 20, and the output voltage $V_H$ is supplied to the traction inverter 50. In the DC chopper of this configuration, the degree in which the voltage is increased is determined in accordance with the ratio (duty ratio) between an on period and an off period in one switching operation cycle of the transistor Tr.

Figure 3:
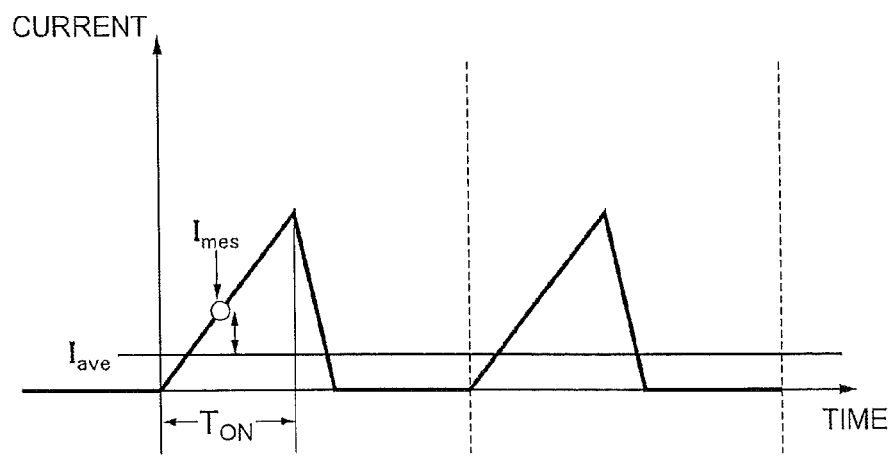
FIG. 3 is a diagram showing one behavior (discontinuous mode) of the electric current flowing through a reactor shown in FIG. 2.
Figure 4:
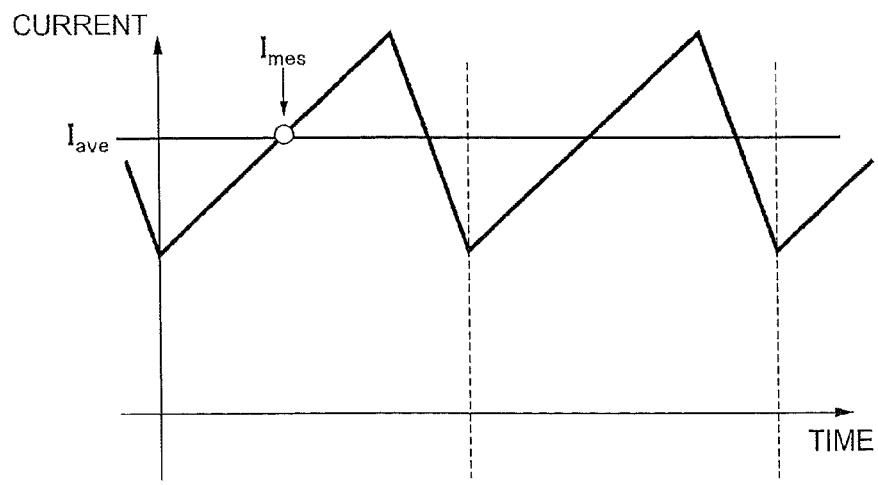
FIG. 4 is a diagram showing another behavior (continuous mode) of the electric current flowing through the reactor shown in FIG. 2.

FIGS. 3 and 4 are diagrams showing the behavior of the reactor current that flows through the reactor L along with the switching operation of the transistor Tr. In particular, FIG. 3 shows the behavior of the reactor current in a low-load operation (which corresponds to, for example, idle running and driving in a traffic jam), in other words, in cases where the required output from the fuel cell 20 is equal to or lower than a predetermined threshold, and hereinafter, a state where the reactor current exhibits such behavior may sometimes be referred to as a discontinuous mode.

Meanwhile, FIG. 4 shows the behavior of the reactor current in cases other than the above-described low-load operation, including in an ordinary operation, and hereinafter, a state where the reactor current exhibits such behavior may sometimes be referred to as a continuous mode.

In the present embodiment, a duty Dref (duty command value) commanded by the control unit 60 to the first converter 30 is a sum of a feed-forward duty (hereinafter, a $D_{FF}$) for feed-forward control of the reactor current that flows through the reactor L and a feed-back duty term (hereinafter, a duty $D_{FB}$) for feed-back control of the reactor current.

The duty $D_{FF}$ is calculated by the control unit 60, or calculated using a reactor current command value Iref supplied from a higher level control unit of the control unit 60, if such higher level control unit is present. The duty $D_{FB}$ is calculated using the reactor current command value Iref and a deviation from an actual measurement value of the reactor current measured by an electric current sensor.

In FIG. 3, $I_{mes}$ is a sensor value of the electric current sensor for measuring the reactor current (more specifically, a value obtained by A/D conversion of the sensor output), obtained at an intermediate time (hereinafter referred to as a midpoint) of the on-duty period, and hereinafter, this value may sometimes be referred to as a midpoint measurement value of the reactor current.

$I_{ave}$ is the average value of the reactor current that increases and decreases with the switching between on-duty and off-duty states.

The present embodiment has a feature of using $I_{mes}'$ represented by equation (1) below, instead of $I_{mes}$, which is a midpoint measurement value of the reactor current and which is used in a conventional configuration for the calculation of a duty $D_{FB}$ for feed-back control of the current, regardless of the output state of the fuel cell 20, in other words, regardless of whether the reactor current is in the discontinuous mode shown in FIG. 3 or in the continuous mode shown in FIG. 4.

$$I'_{mes} = \frac{V_H}{V_H - V_L} D_{FF} \times I_{mes} \quad (1)$$

As can be seen from equation (1) above, using $I_{mes}'$ instead of $I_{mes}$ is equivalent to multiplying $I_{mes}$ by a predetermined conversion coefficient:

$$V_H/(V_H-V_L)*D_{FF},$$

and thereby converting (correcting) it into $I_{mes}'$.

As explained further below, $I_{mes}'$ and $I_{ave}$ represented by equation (3) below have the same value regardless of whether the reactor current is in the discontinuous mode or in the continuous mode. In other words, according to the present embodiment, regardless of the mode of the reactor current, the midpoint measurement value of the reactor current can be converted to the average value of the actual current through the use of common control logic, enabling the converter to be controlled with high accuracy and responsiveness based on the accurately obtained actual current value.

The reason for $I_{mes}'=I_{ave}$ will be described below, with reference to FIGS. 2 and 3.

In the circuit configuration shown in FIG. 2, the equation:

$$V_L=L*(dI/dt)$$

holds electromagnetically, wherein dI/dt is a time derivative of the reactor current, and the equation:

$$dI/dt=V_L/L$$

can thus be derived.

Meanwhile, in the behavior of the reactor current shown in FIG. 3, the equation:

$$I_{mes}=(dI/dt)*(Ton/2) \quad \text{I}$$

holds geometrically, wherein Ton is an on-duty period.

Here, the equation:

$$Ton=D_{FF}*T=D_{FF}*(1/f)$$

holds, wherein T is a switching cycle and f is a switching frequency of the transistor Tr, and thus, $I_{mes}$ can be represented by equation (2) below.

$$I_{mes} = \frac{1}{2}\frac{V_L D_{FF}}{Lf} \quad (2)$$

$I_{mes}$, thus obtained, is a midpoint measurement value of the reactor current recognized by the control unit 60.

Figure 5:
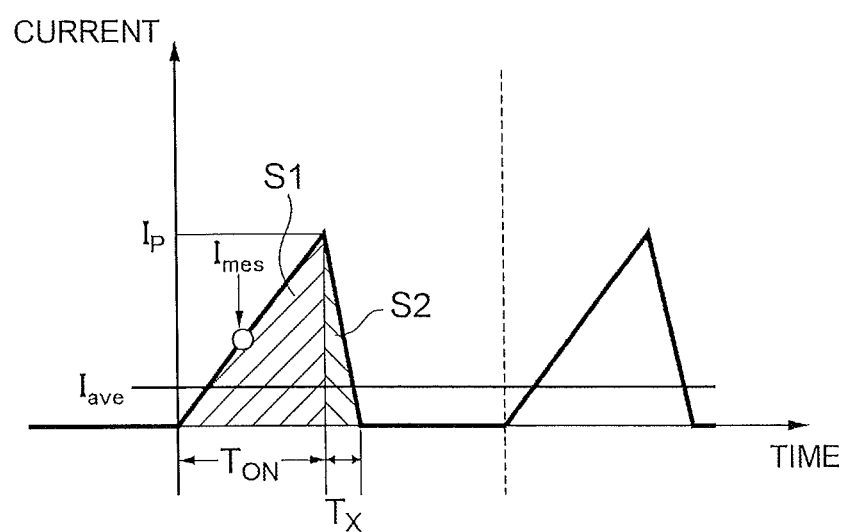
FIG. 5 is an explanatory diagram in which the major part of FIG. 3 is enlarged.

In FIG. 5 in which the major part of FIG. 3 is enlarged and hatching, etc., is used in a portion thereof to provide an explanation of $I_{ave}$, when the time during which the reactor current is greater than zero during an off-duty period is defined as Tx, a value of time integral of the reactor current during Ton is defined as S1, a value of time integral of the reactor current during Tx is defined as S2, and a peak value of the reactor current is defined as Ip, the equation:

$$I_{ave}=(S1+S2)/T$$

holds geometrically.

Also considering the fact that, during Ton, the equations:

$$S1=(½)*Ip*Ton;$$

$$Ip=(dI/dt)*Ton; \text{ and}$$

$$V_L=L*(dI/dt)$$

hold and, during Tx, the equations:

$$S2=(½)*Ip*Tx;$$

$$Ip=(dI/dt)*Tx; \text{ and}$$

$$V_H-V_L=L*(dI/dt)$$

hold geometrically or electromagnetically, $I_{ave}$ can be represented by equation (3) below. Note that dI/dt during Ton and dI/dt during Tx are different from each other.

$$I_{ave} = \frac{1}{2}\frac{V_H V_L}{(V_H - V_L)}\frac{D_{FF}^2}{Lf} \quad (3)$$

$I_{ave}$ represented by equation (3) above can also be represented by equation (4) below by using equation (2) that represents $I_{mes}$.

$$I_{ave} = \frac{V_H}{V_H - V_L} D_{FF} \times I_{mes} \quad (4)$$

Since the right side of equation (1) and the right side of equation (4) are the same, it can be understood that $I_{mes}'=I_{ave}$ holds in the discontinuous mode shown in FIG. 3.

In the continuous mode shown in FIG. 4, since the equation:

$$D_{FF}=1-(V_L/V_H)$$

holds, $I_{ave}=I_{mes}$ can be derived by substituting the right side of the above equation for $D_{FF}$ in equation (4).

It can be understood from the above that, even in the continuous mode shown in FIG. 4, $I_{mes}'$ represented by equation (1) can be used instead of $I_{mes}$, in other words, common control logic can be used.

As described above, according to the present embodiment, when using a midpoint measurement value of the reactor current in the discontinuous mode, the midpoint measurement value can be converted to the average current value, and accordingly, an occurrence of a gap between the midpoint measurement value and the average current value can be suppressed. Consequently, both responsiveness and accuracy of the converter control can be improved at the same time.

Further, since common control logic can be used regardless of the mode of the reactor current, there is no need to change the control logic between the continuous mode and the discontinuous mode. As a result, the redundancy as well as complexity of the converter control can be reduced.

The invention is not limited to the above embodiment, and instead of the $D_{FF}$ in the above embodiment, a final command value obtained by reflecting feed-back into the $D_{FF}$ (in other words, a duty command value being a sum of a feed-forward duty and a feed-back duty) may be used.

Specifically, the predetermined coefficient may be defined as $$D*V_H/(V_H-V_L)$$

wherein, $V_L$ and $V_H$ respectively represent an input voltage and output voltage of the converter and D represents a duty command value.

In the above case, the control unit can use a value obtained by multiplying a midpoint measurement value by $D*V_H/(V_H-V_L)$ as a measurement value of the reactor current, even in an operation other than the low-load operation.

DESCRIPTION OF REFERENCE NUMERALS

10 . . . fuel cell system; 20 . . . fuel cell; 30 . . . first converter (converter); 60 . . . control unit; 80 . . . traction motor (load); L . . . reactor; Tr . . . transistor (switching device)

What is claimed is:

1. A fuel cell system comprising:
a converter disposed between a fuel cell and a load to increase an output voltage of the fuel cell; and
a control unit that controls the converter at a predetermined duty ratio,
wherein the control unit determines a duty command value for the converter from a feed-forward duty and a feed-back duty,
wherein the feed-forward duty and the feed-back duty are calculated using a command value of a reactor current that flows through a reactor in the converter and/or using a measurement value of the reactor current,
wherein, in a low-load operation in which a required output from the fuel cell is equal to or lower than a predetermined value, the control unit sets a value obtained by multiplying a midpoint measurement value measured at an intermediate time of an on-duty period by a predetermined coefficient, and
wherein the value corresponds to a measurement value of the reactor current that increases and decreases along with switching control of a switching device in the converter at a predetermined duty ratio.

2. The fuel cell system according to claim 1, wherein the predetermined coefficient is defined as $$D_{FF}*V_H/(V_H-V_L)$$

wherein $V_L$ and $V_H$ respectively represent an input voltage and an output voltage of the converter and $D_{FF}$ represents the feed-forward duty.

3. The fuel cell system according to claim 2, wherein the control unit uses a value obtained by multiplying the midpoint measurement value by $D_{FF}*V_H/(V_H-V_L)$ as a measurement value of the reactor current, even in an operation other than the low-load operation.

4. The fuel cell system according to claim 1, wherein the predetermined coefficient is defined as $$D*V_H/(V_H-V_L)$$

wherein $V_L$ and $V_H$ respectively represent an input voltage and an output voltage of the converter and D represents the duty command value.

5. The fuel cell system according to claim 4, wherein the control unit uses a value obtained by multiplying the midpoint measurement value by $D*V_H/(V_H-V_L)$ as a measurement value of the reactor current, even in an operation other than the low-load operation.

* * * * *